UNITED STATES PATENT OFFICE.

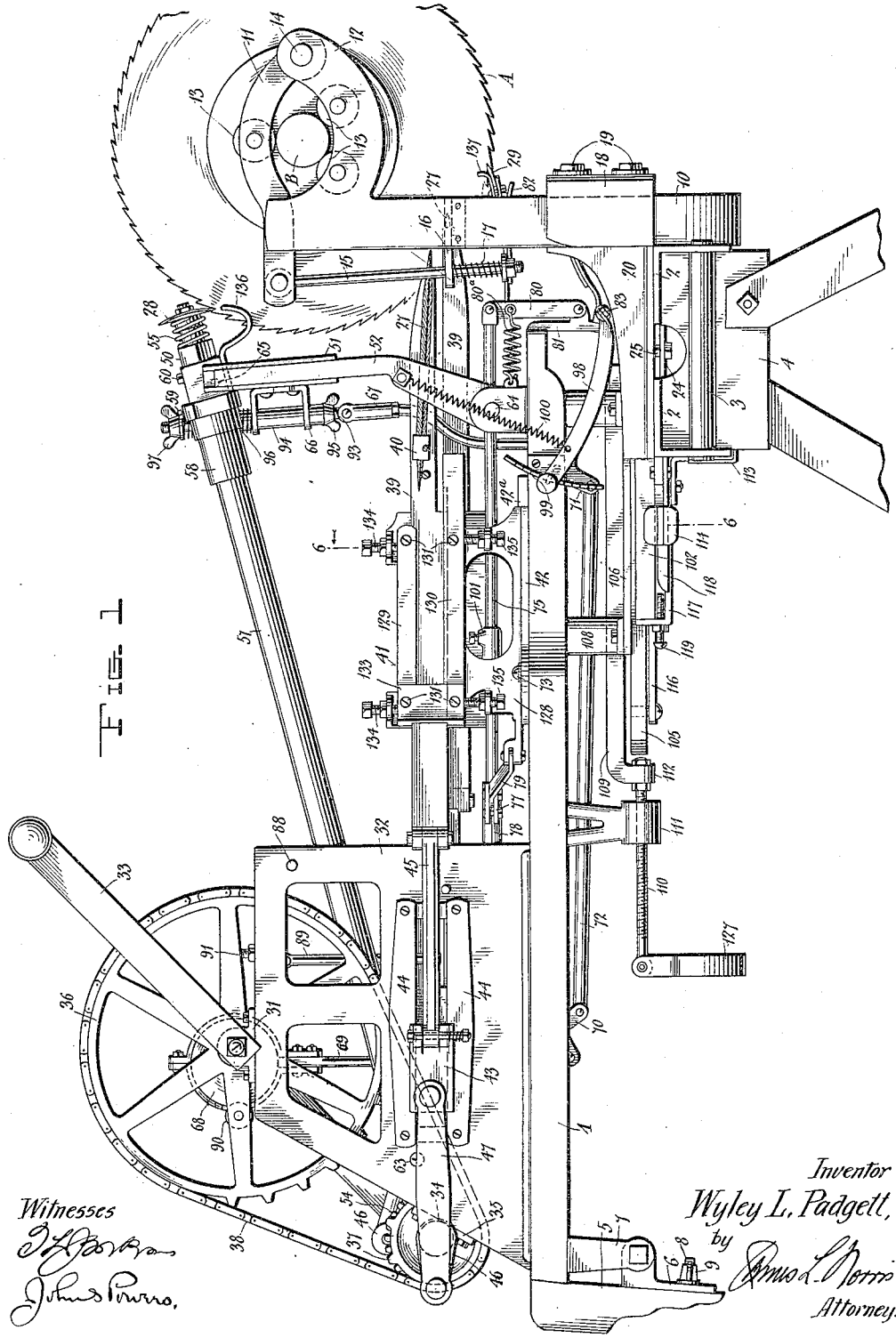

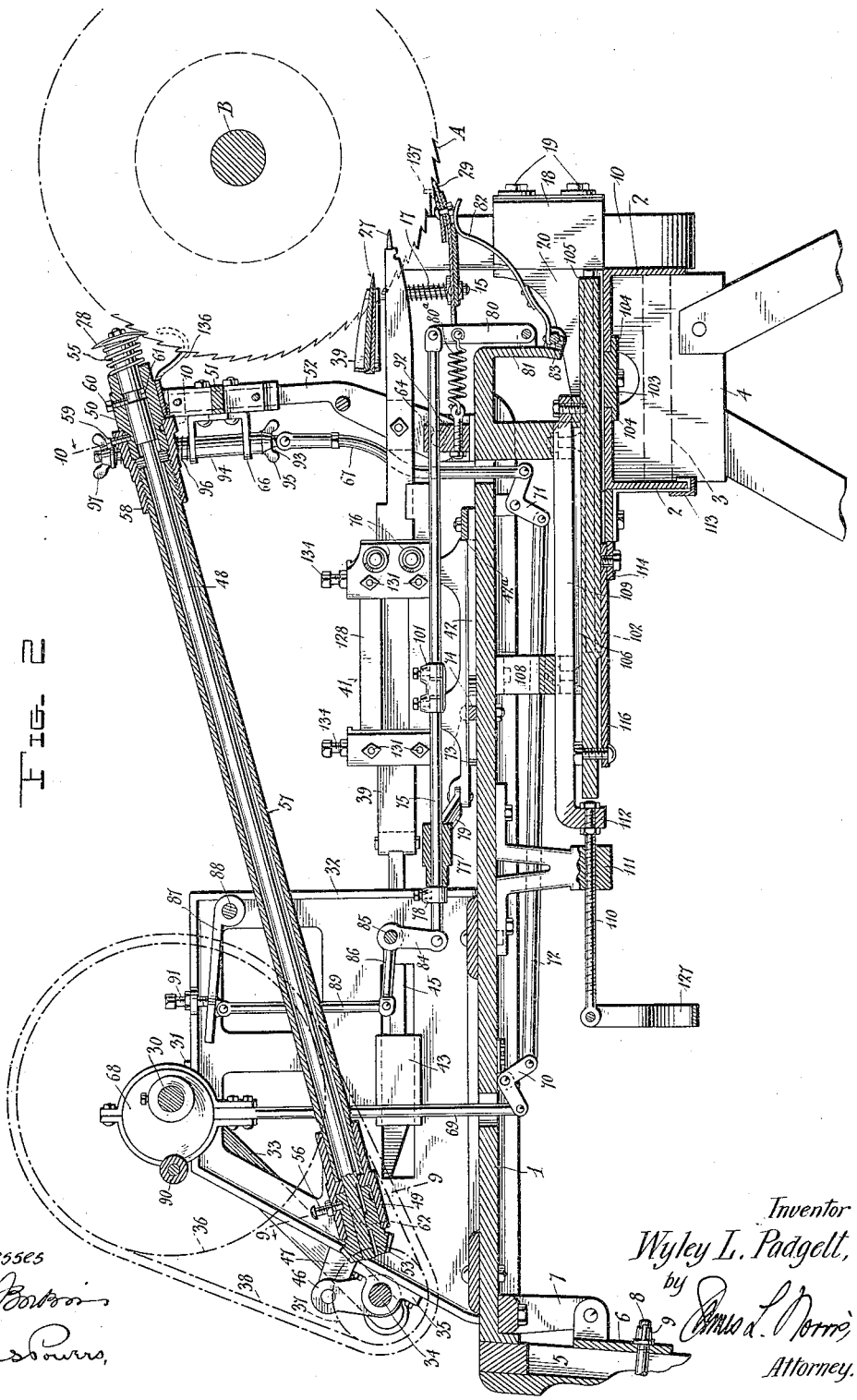

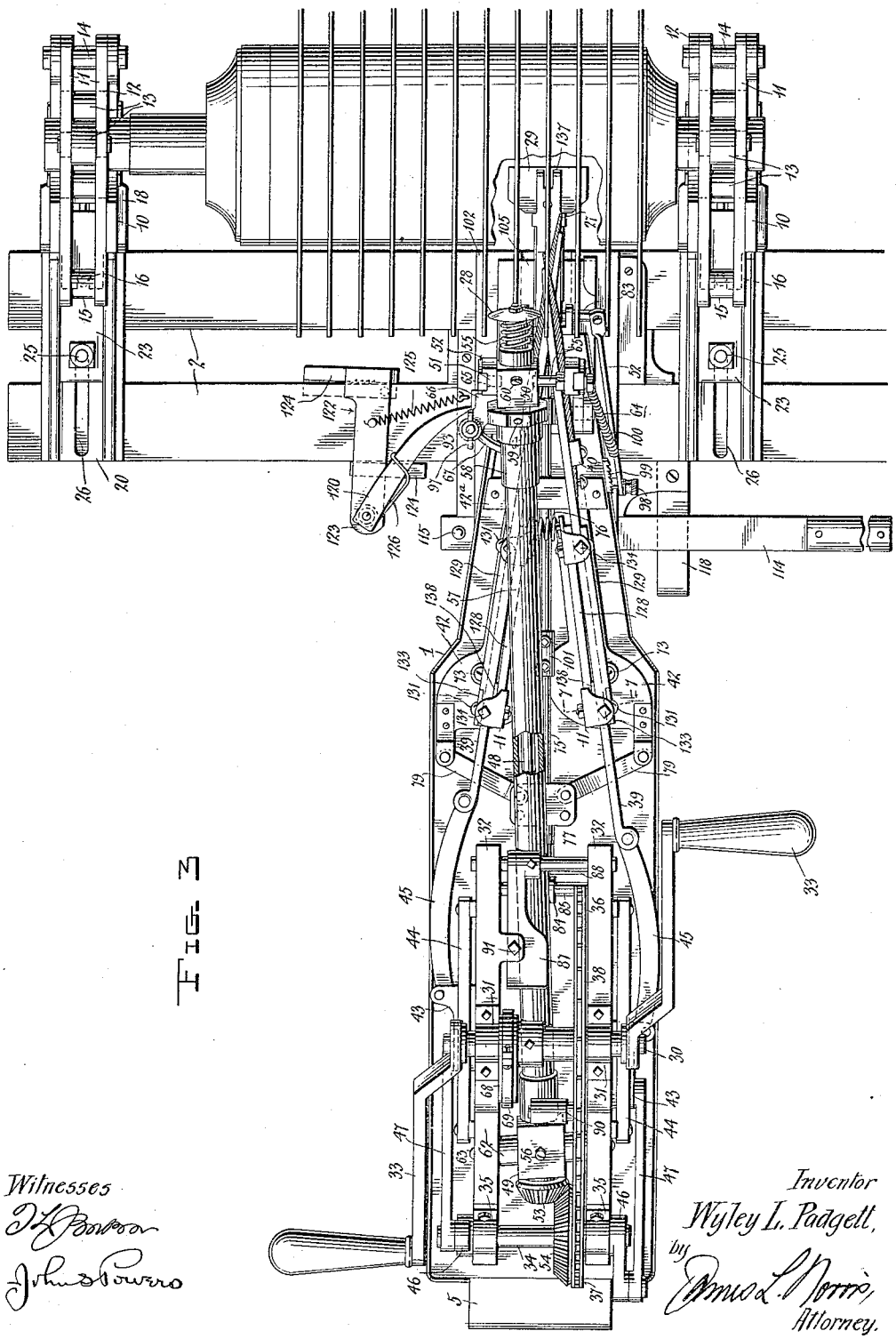

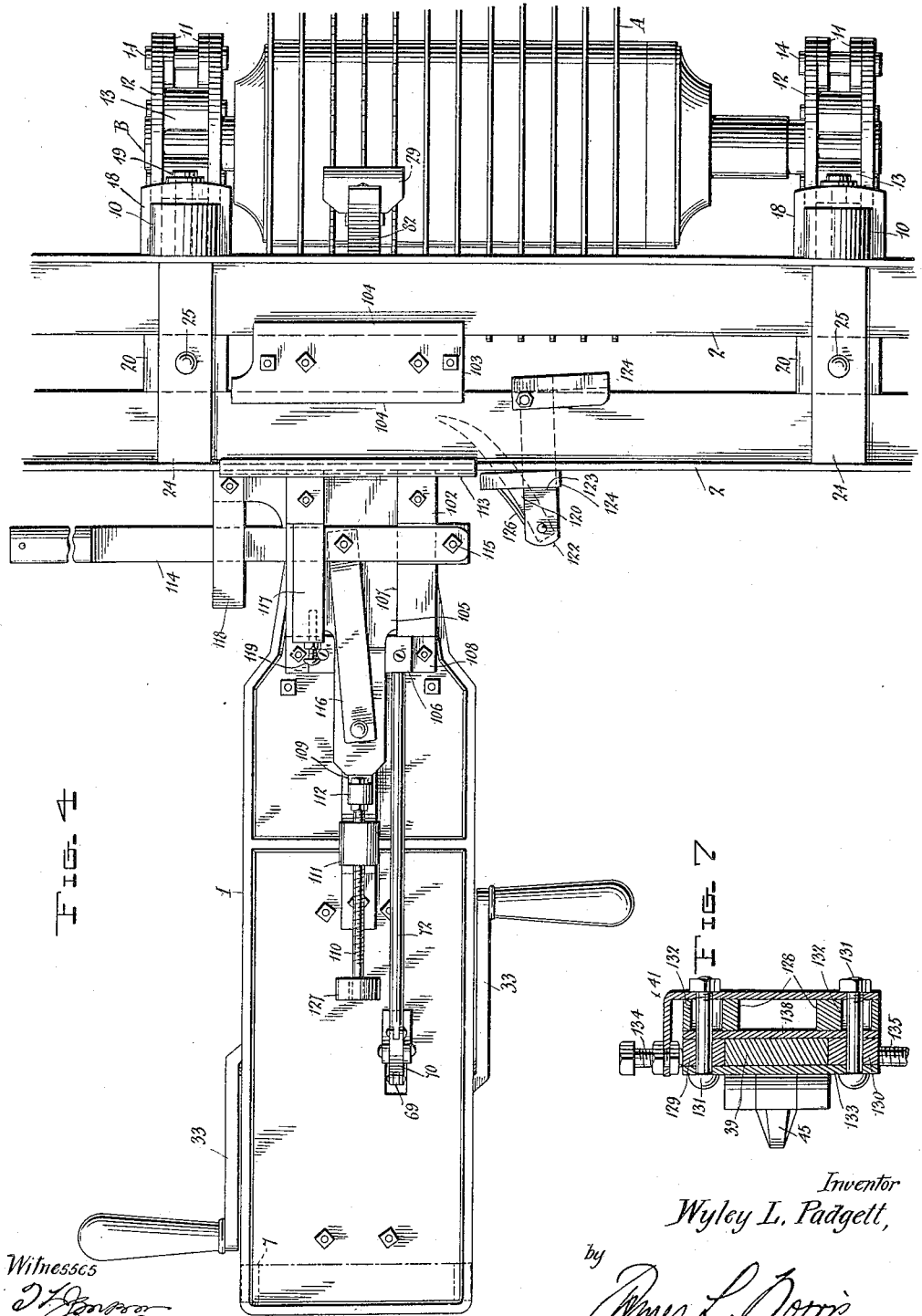

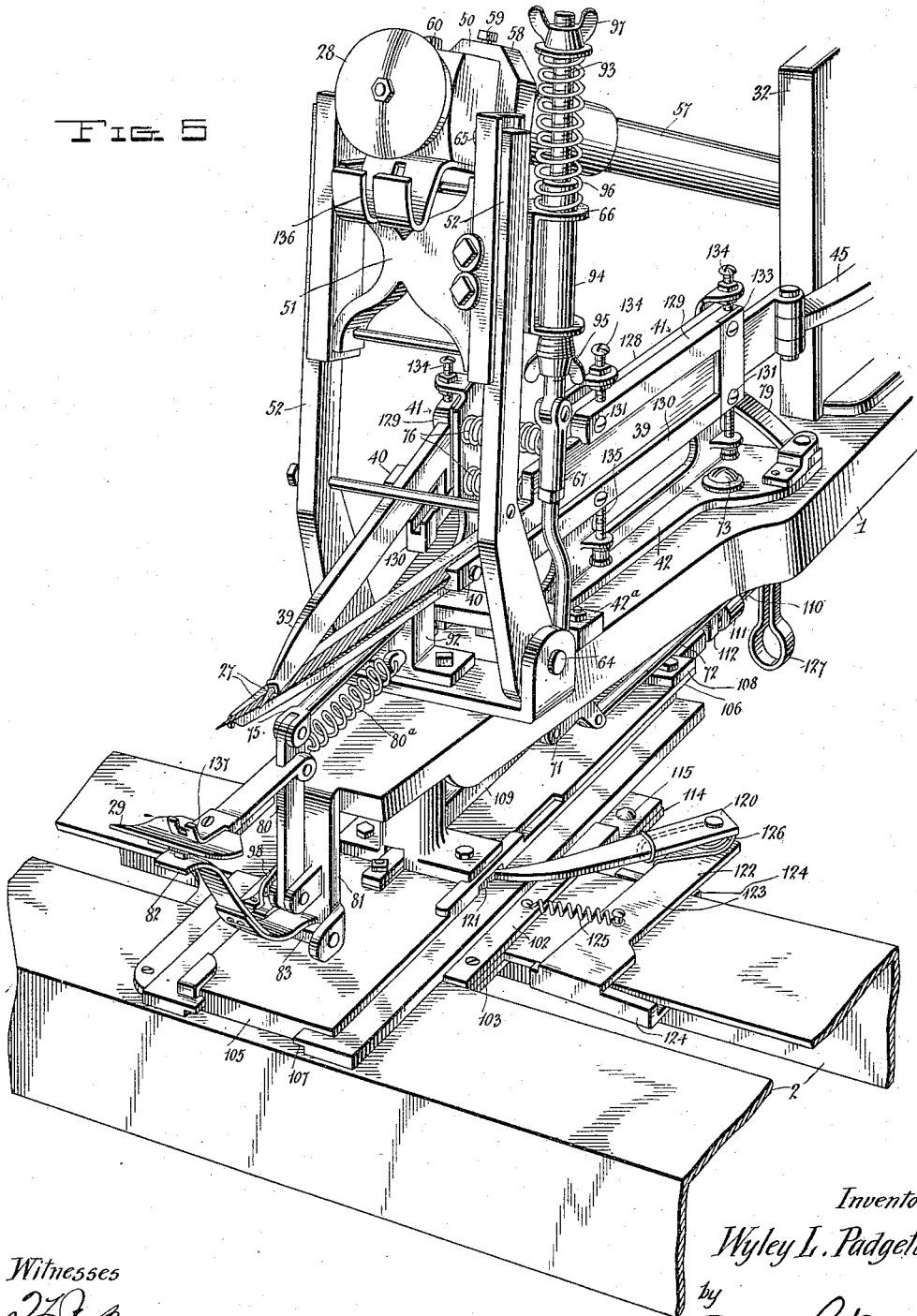

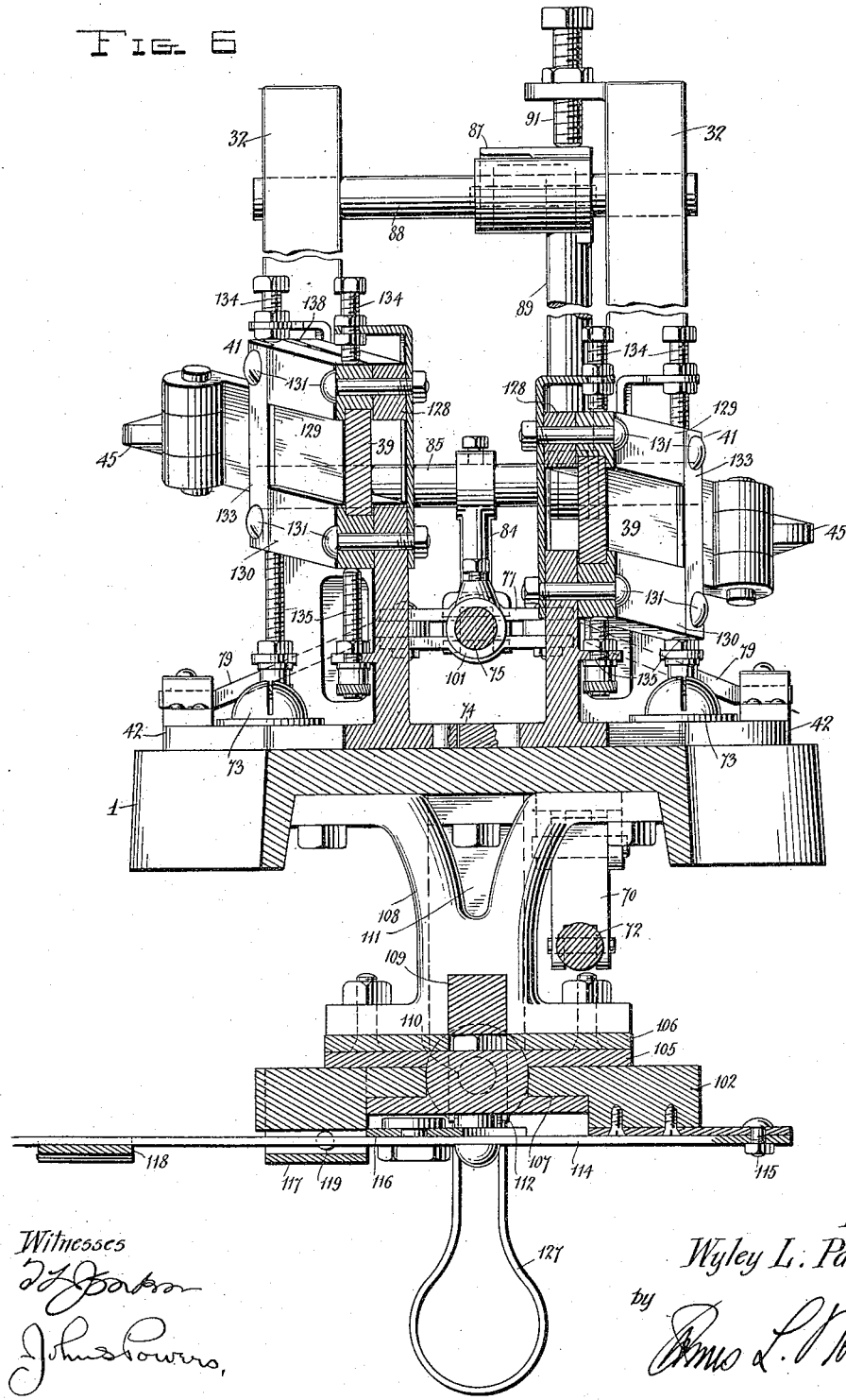

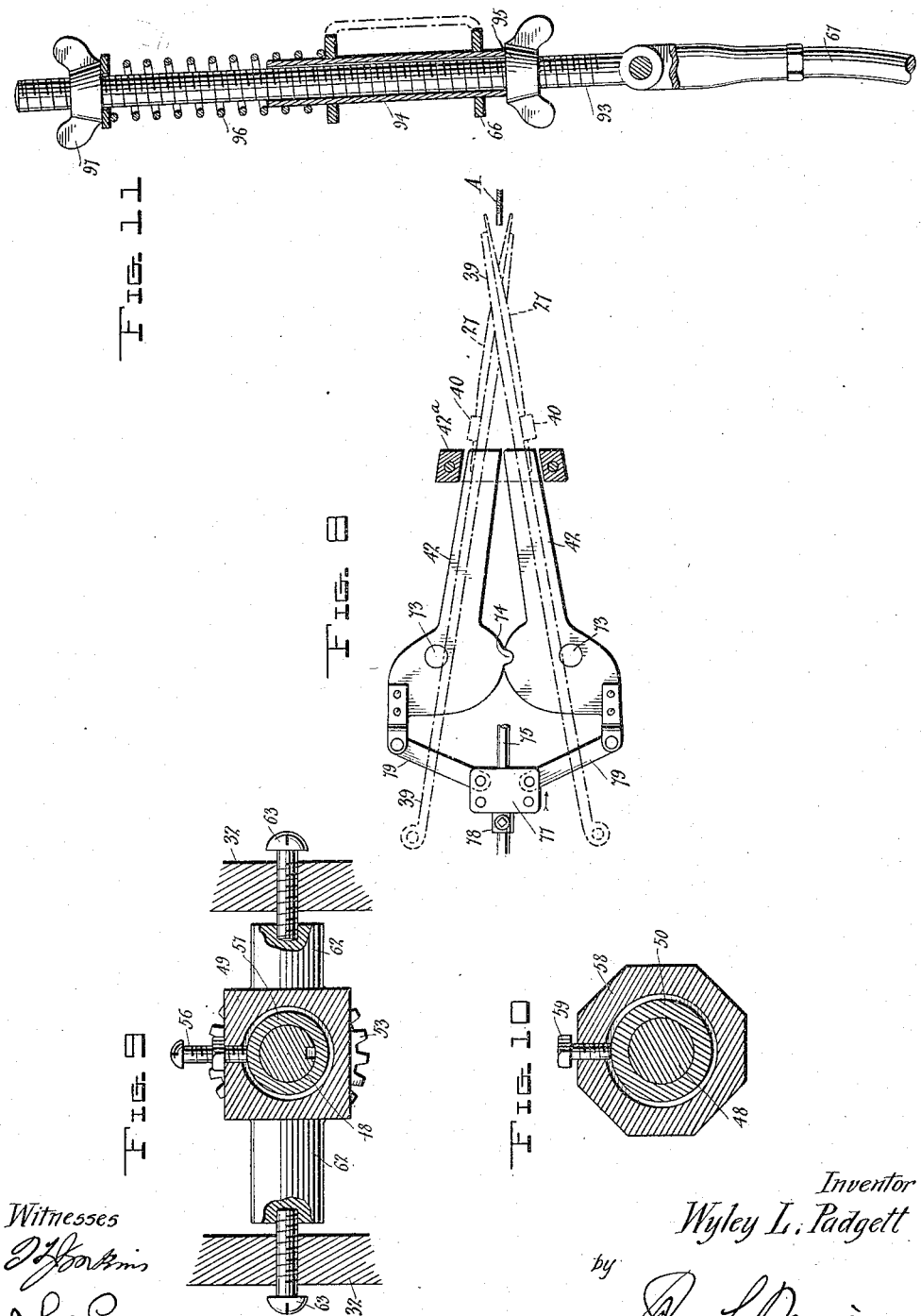

WYLEY L. PADGETT, OF SPARTANBURG, SOUTH CAROLINA.

GIN-SAW-SHARPENING MACHINE.

1,174,892. Specification of Letters Patent. Patented Mar. 7, 1916.

Application filed September 7, 1915. Serial No. 49,303.

*To all whom it may concern:*

Be it known that I, WYLEY L. PADGETT, a citizen of the United States, residing at Spartanburg, in the county of Spartanburg and State of South Carolina, have invented new and useful Improvements in Gin-Saw-Sharpening Machines, of which the following is a specification.

This invention relates to machines for sharpening gin saws, proposing a machine which includes both filing and gumming instrumentalities and means for automatically shifting the saws in order to present the teeth thereof successively to the said instrumentalities.

The objects of the invention, briefly stated, are to provide a simple and efficient machine for sharpening cotton gin saws; to provide a machine which will perform its work with rapidity and accuracy; to provide a machine which may be readily adapted to saws of varying diameter; to provide a machine having its saw filing and gumming instrumentalities so organized that the teeth of the saws can be filed to any shape or angle desired; to provide a machine wherein the saw teeth will be filed in symmetrical relation to the planes of the saws; and to provide a means for quickly and conveniently shifting the machine relatively to the group of saws to be sharpened in order to bring the machine, upon the completion of the work on one saw, in operative relation to the saw next in order in the group.

Other objects and advantages will appear as the description proceeds.

The invention consists in certain novel features of structure, combination and relation which will be fully pointed out in the succeeding description.

An embodiment of the invention is illustrated in the accompanying drawings, wherein:—

Figure 1 is a side elevation of a saw filing and gumming machine in which the features of the invention are incorporated; Fig. 2 is a central longitudinal sectional view thereof; Fig. 3 is a top plan view thereof; Fig. 4 is a bottom plan view thereof; Fig. 5 is a perspective view of the front portion of the machine; Fig. 6 is a cross-section on the line 6—6 of Fig. 1 looking in the direction of the arrow; Fig. 7 is a detail cross-sectional view on the line 7—7 of Fig. 3; Fig. 8 is a diagrammatic plan view showing details of the filing instrumentality; Fig. 9 is a detail cross-sectional view on the line 9—9 of Fig. 2 looking in the direction of the arrow; Fig. 10 is a detail cross-sectional view on the line 10—10 of Fig. 2 looking in the direction of the arrow; Fig. 11 is a detail sectional view showing the supporting means for the sliding cross head of the gummer shaft.

Similar characters of reference designate corresponding parts throughout the several views.

The instrumentalities of the machine are supported directly or indirectly from a somewhat elongated bed plate 1 which preferably has an inverted channel shape in cross-section, as shown in Fig. 6, and is, in turn, suitably supported at its front and rear ends. The support for the machine at the front end of the bed plate preferably comprises a pair of spaced angle irons 2 having their side flanges extended downwardly and connected at appropriate intervals by bolts on which are mounted spacing sleeves 3. The flanges 2 are conveniently supported on pedestals 4 or otherwise. The support for the machine at the rear end of the bed plate 1 preferably comprises a pedestal 5, the legs of which may be provided at their lower ends with rollers or casters, (not shown). The connection between the bed plate 1 and the pedestal 5 preferably comprises a transverse plate 6 which is pivoted to depending lugs 7 carried by said bed plate, a bolt 8 provided near the upper end of the pedestal 5 for engagement through a suitable opening in the plate 6 and a wing nut 9 threaded upon the inner end of the bolt 8. Obviously, by removing the nut 9 from the bolt 8 the pedestal 5 and the bed plate 1 may be disconnected.

The saws to be sharpened are supported from the angle irons 2 through the intermediary of upright bearings 10 provided at the ends of said angle irons and having bearing arms 11 and 12 preferably provided with friction rollers 13. The arms 11 which are at the upper sides of said bearings are pivoted at their outer ends as at 14 to the arms 12 and at their inner ends are provided with pivoted retaining bolts 15, which, in operative relation, engage through slots in retaining plates 16 projecting rearwardly from the bearings 10. The bolts 15 preferably carry expansive coil springs 17 which engage under the plates 16 and tend to press the bolts 15 downwardly so as to draw the upper bearing arms 11 toward the lower bearing arms 12. The gin saws, designated A, remain during the sharpening operations in the normal order and manner of their assemblage upon their shaft or mandrel B and the ends of the latter project between the arms 11 and 12 and engage the friction rollers 13 carried by said arms. By virtue of this relation, an accurate positioning of the saws with relation to the sharpening machine is insured and the rotary step-by-step movement of the saws is facilitated.

The upright standards of the bearings 10 are adjustably fitted in clamping sleeves 18 and are normally held against movement by bolt-and-nut fastenings 19 which connect the removable outer members of the sleeves 18 and the fixed inner members of said sleeves, the said inner members being formed as parts of plates 20 which extend across and rest upon the angle irons 2 and are, in turn, clamped upon said angle irons through the intermediary of upper and lower plates 23 and 24 and bolts 25 connecting said plates. The plates 20 are adjustable lengthwise of the plates 23, and are provided with slots 26 through which the bolts 25 project. The plates 24 are sufficiently narrow in width to permit their introduction through the longitudinal space between the angle irons 2 and when the plates 24 have been passed through said spaces they are turned on the bolts 25 as pivots to positions transversely of the angle irons wherein they engage the under faces thereof. Obviously, by adjusting the plates 20 relatively to the plates 23, the bearing sleeves 18 may be made to project to any desired extent within the range of adjustment in front of the angle irons 2. The elevation of the gin saw shaft B relatively to the angle irons 2 is determined by vertical adjustments of the upright standards of the bearings 10 relatively to the sleeves 18 by which said standards are clamped.

The instrumentalities of the machine are a saw filing mechanism including a pair of reciprocatory files 27 which work in intersecting relation at opposite sides of the saw to be sharpened, a saw gumming mechanism including a rotary file 28 which works in the spaces between the saw teeth, and a saw feeding mechanism including a saw tooth engaging pawl 29 which is preferably of a width, as shown in Figs. 3 and 4, to extend across and simultaneously engage three of the saws. The power for the operation of the several instrumentalities above named is derived from a transverse, continuously rotatable shaft 30 located near the rear end of the machine and journaled in bearings 31 provided on side frame members 32. The shaft 30 projects at one or both ends beyond the frame members 32 and is conveniently operated by one or a pair of crank handles 33, although said shaft may be operated by power if desired. As shown, and preferred, a crank handle 33 is mounted upon each of the projecting ends of the shaft 30, although if desired but one of said crank handles may be employed.

The saw filing and gumming instrumentalities are directly operated from a transverse shaft 34 located at the rear end of the machine and journaled in bearings 35 secured to the frame members 32. The shaft 34 is located at some distance below and in the rear of the shaft 30 and is suitably geared to the latter, the gearing preferably comprising a relatively large sprocket wheel 36 on the shaft 30, a substantially smaller sprocket wheel 37 on the shaft 34, and a chain 38 connecting said sprocket wheels.

The saw filing mechanism comprises a pair of reciprocatory file-holding bars 39 against which the files 27, (which are of ordinary triangular form), are held by suitable clamps or clips 40, guides 41 through which the bars 39 are reciprocated in the direction of their axes, pivoted base plates 42 carrying the guides 41 and from which said guides are upright, slidable cross heads 43 working in guides 44 secured on the frame members 32, and links 45 connecting the cross heads 43 and the bars 39. The saw filing instrumentality is operated for the purpose of sharpening the saws from the shaft 34 through the intermediary of crank arms 46 provided at the ends of said shaft and pitmen 47 connecting the crank arms 46 and the cross heads 43. The crank arms 46 are preferably disposed at angles to one another in order that the files may be moved in opposite directions during periods of their operation.

The file carrying bars 39 are located respectively above and below one another and have a converging relation, as clearly shown in Figs. 3 and 5, whereby the files 27 will be reciprocated in intersecting paths and will work at opposite sides of the saw to be sharpened.

The saw gumming mechanism includes a shaft 48 which at its front end carries the gummer 28, an oscillatory bearing 49 for the rear end of said shaft, a bearing 50 for the front end of said shaft, a vertically reciprocatory cross head 51 carrying the bearing 50 and a pivotally mounted frame 52 along which the cross head 51 may slide in its reciprocatory action. The shaft 48 is driven from the shaft 34 through the intermediary of bevel gears 53 and 54 on said shafts 48 and 34, respectively, the gear 53 being of substantially smaller diameter than the gear 54, whereby the speed of the shaft 48 is multiplied. The gear 43 is, as shown in Fig. 2, provided with a feather which engages in an elongated key-way at the rear end of the shaft 48 whereby the latter may be moved in the direction of its axis relatively to the gear 53 without becoming disconnected from said gear. The object of providing for a movement of the shaft 48 in the direction of its axis relatively to the gear 53 is two-fold; first, to permit a slight axial play of the shaft 48 during the operation of the gummer 28, which play is taken up or cushioned by an expansive spring 55 arranged on the shaft 48 between the gummer and the bearing 50, and second, to provide for a lengthwise adjustment of the shaft 48 whereby to cause a corresponding projection or retraction of the gummer 28 for the purpose of adapting the machine to saws of different diameter. The bearing 49 for the rear end of the shaft 48 is also utilized for the gear 53 and is provided with a rearwardly extending socket in which a hub extension of said gear is journaled, a screw 56 engaging in an annular groove in the hub extension of the gear 53 being employed to hold the gear 53 against axial displacement. The portion of the shaft 48 between the gears 49 and 50 is preferably inclosed by a stationary sleeve 57, one end of which is socketed in a forward extension of the bearing 49 and the other end of which is threaded and carries an adjusting nut 58, which fits over the rear portion of the bearing 50 and is provided with a screw 59 engaging in an annular groove in said bearing. When the screw 59 is loosened or slackened, the nut 58 may be turned relatively to the bearing 50 and to the shaft 57 and the obvious effect of thus turning the nut is to project or retract the bearing 50 relatively to the sleeve 57. The bearing 50 is provided with a screw 60 which engages in an annular groove 61 in the shaft 48 and it is obvious that when the bearing 50 is projected or retracted relatively to the sleeve 57, such movement is transmitted to the shaft 48 through the screw 60 and it thereby results that the gummer 28 is similarly projected or retracted. In this way the position of the gummer may be adapted to saws of varying diameter. Upon wholly disengaging the screw 60 from the groove 61, the shaft 48 may be withdrawn lengthwise from the forward end of the machine. In certain operations, it may not be necessary or desirable to employ the gummer, and at such time the shaft 48 with the gummer attached thereto is withdrawn from the machine in the manner described. The groove 61 is sufficiently wide to permit the shaft 48 to have the above-described loose play in the direction of its axis. The shaft 48, in addition to the rotary movement transmitted thereto by the gear 53, also has a vertical oscillatory movement in the plane of the machine in order that the gummer may be disengaged, at periods in the operation of the machine from the saw, such disengagement of the gummer from the saw being provided for in order to permit of the operation during the periods of disengagement of the saw feeding instrumentalities. To provide for such oscillatory movement of the shaft 48, the bearing 49 is also mounted for oscillatory movement and is provided with end studs 62 for engagement by pivot screws 63 carried by the frame members 32; and the front end of the shaft 48 is supported, as above explained, through the intermediary of the reciprocatory cross head 51 and the frame 52, which latter is pivoted at its lower end, as at 64, to the bed plate 1 along an axis transverse to said bed plate. The bearing 50 is mounted for oscillatory movement relatively to the cross head 51, which latter has its side bars formed to straddle said bearing and provided with pivot screws 65 to engage in recesses in the adjacent sides of the bearing 50.

The saw filing and saw gumming instrumentalities, in addition to their normal operations of filing and gumming the saws, are operated at periods in the action of the machine to disengage the saws in order to permit of the action of the saw feeding instrumentalities.

The saw gumming instrumentality is operated to disengage the saws by elevating the shaft 48 about the studs 62 as an axis and upon the completion of the operation of the saw feeding mechanism the shaft 48 is lowered in order to engage the gummer 28 with the adjacent recess in the saw. The mechanism for operating the saw gumming instrumentality to effect the disengagement of the gummer from the saw upon which it operates during an interval in which the saw feeding mechanism is operated is preferably of the following construction:—The cross head 51 has a rearward extension 66 which is connected, as will be hereafter described, to a vertical reciprocatory rod 67. The rod 67 derives its motion from the shaft 30 through the intermediary of an eccentric 68 on said shaft, a strap 69 depending from said eccentric and at its lower end extending through an opening in the bed plate, a bell crank lever 70 pivoted to the bed plate adjacent the under face thereof and to which the lower end of the strap 69 is connected, a second bell crank lever 71 similarly pivoted to the bed plate near the front end of the machine and to which the lower end of the rod 67 is connected and a link 72 connecting the bell cranks 70 and 71.

The saw filing instrumentality is operated to disengage the saws at periods in the action of the machine during which the operation of the saw feeding mechanism takes place by moving the files 27 about pivotal axes away from the faces of the saw upon which they are operating. It is with the object of providing for such pivotal movements of the files 27 that the base plates 42 which carry the guides 41 for the file-carrying bars 39 are pivoted upon the bed plate 1. This relation is shown in Fig. 8 where the pivots of the base plates 42 are indicated at 73 and the guide or keeper through which the front end portions of the plates 42 project is indicated at 42ª. To positively insure of the requisite pivotal movements of the bases 42 about their pivots 73, one of said bases is provided at its pivotal end with a tooth and the other of said bases is provided at its pivotal end with a recess in which said tooth engages, the said tooth and recess thus co-acting as gear elements. The pivotal movements of the bases 42 are effected in a direction to move the files 28 away from the saws upon which they are operated from the longitudinal movement of a reciprocatory bar 75, and the return movement of the bases 42 which effects the engagement of the files 27 with the saws upon the completion of the saw feeding mechanism is effected, in the embodiment disclosed, by expansive coil springs 76 arranged in transverse relation between the guides 41 for the file carrying bars 39. The connections for operating the bases 42 about their pivots 73 comprise a block or sleeve 77 mounted on the bar 75 and held by the springs 76 against a collar 78 on said bar and links 79 connecting the block or sleeve 77 and the pivotal rear portions of the bases 42, the said links 79 being arranged and operating toggle fashion.
The saw feeding mechanism includes a forwardly and rearwardly movable element 80 to which the pawl 29 is pivoted for movement in a vertical plane and from which said pawl projects forwardly. The element 80 is preferably, and as shown, in the form of a lever and is pivoted at its lower end to an apron 81 depending from the front of the bed plate 1. The pawl 29 is held in relation to the saw upon which it operates, preferably by a leaf spring 82, which at its free end engages the under side of said pawl and which is carried by a rod 83 journaled for rocking movement in ears provided on the apron 81. The pawl 29 is normally held in retracted relation by a retractile coil spring 80ª secured to the lever 80 and at its rear end secured to a stationary part of the machine. The mechanism for operating the pawl 29 includes the reciprocatory bar 75 above referred to and which bar is pivotally connected at its front end to the lever 80, an arm 84 connected to the rear end of the rod 75 and mounted on a rock shaft 85 supported by and between the frame members 32, an arm 86 projecting from the shaft 85 at an angle to the arm 84, an operating lever 87 mounted for oscillatory movement on a rod 88 supported between the frame members 32, a link 89 connecting the lever 87 and the arm 86 and a cam pin 90 preferably secured upon the sprocket wheel 36 and engaging the lever 87 during a period of each revolution of the spring wheel, the pin 90 being preferably provided with a friction roller. The return movement of the lever 87 after it has been released by the pin 90 is limited by a stop screw 91 carried by the adjacent frame member 32. The rod 75 is supported by a guide block 92 arranged near the front end of the machine and its pivotal connections with the arm 84 and the lever 80 are sufficiently loose to compensate for the differences in the direction of movement of the elements 84 and 80 and the rod 75. The bar 75, in the embodiment shown, is, as will be apparent from the foregoing description, utilized as an element of two mechanisms. In the first place, it operates the saw filing instrumentality to disengage the files 27 from the saws, for this purpose acting on the cross head 77, as above explained, and in the second place, it operates the pawl 29 to feed the saws through the distance of one tooth. While this relation is preferred, it is obviously not obligatory.

The cross bar 51 is reciprocatory in order that it may participate in the operation of disengaging the gummer 28 from the saw during the interval in which the saw feeding mechanism operates, as above explained. The reciprocatory mounting of the cross head 51 as also the oscillatory mounting of the bearing 49 are, however, additionally utilized in connection with the adjustment of the elevation of the gummer in adapting the same to saw teeth of different form or angle. For the purpose of providing for such adjustment of the elevation of the gummer, the rod 67 includes as a constituent part thereof a pivotally mounted threaded stem 93 upon which is loosely mounted a sleeve 94 having near its lower end a portion of enlarged diameter against which the lower part of the rearward extension 66 of the cross head 51 bears, as shown in Fig. 11. The sleeve 94 rests against an adjusting nut 95 which is threaded on the stem 93 and by the movement of which along said stem the sleeve 94 and therewith the cross head 51 is raised or lowered. By thus adjusting the relative elevation of the cross head 51, a similar adjustment of the elevation of the shaft 48 and the gummer 28 is effected, as is obvious. The extension 66 is held against the enlarged lower portion of the sleeve 94 by an expansive coil spring 96 which surrounds the upper portion of the stem 93, bearing at its lower end against the upper part of the extension 66 and at its upper end against a stop collar or nut 97. To facilitate the assemblage of the machine relatively to the saws, as well as to adjust the angle of the pawl 29 whenever there is occasion for such adjustment, the rod 83 which carries the spring 82 is provided at one side thereof with a handle 98 which works in relation to a rack quadrant 99 secured at the adjacent side of the bed plate 1 and is provided with a tooth to engage said quadrant. The handle 98 is connected to the rod 83 for lateral pivotal movement in order that it may be disengaged from and engaged with the rack quadrant 99 and the engagement of the handle 98 with said rack quadrant is assured by a retractile coil spring 100 having one end connected to said handle and having its other end connected, in the embodiment disclosed, to one of the side bars of the frame 52 along which the cross head 51 slides. Upon disengaging the handle 98 from the rack quadrant 99, said handle may be manipulated, as is obvious, to turn the rod 83 and thereby raise or lower the spring 82 which yieldingly supports the pawl 29. As the spring 82 is raised, the pawl 29 is similarly raised, and as the spring 82 is lowered, the pawl 29 is similarly lowered. To raise the pawl 29 or to increase the tension of the spring 82 upon said pawl, it is unnecessary to disengage the handle 98 from the rack quadrant 99, all that is required being simply to move the handle 98 downwardly, in which movement its tooth rides along the file of the quadrant 99. On the other hand, to lower the pawl 29 or to decrease the tension of the spring 82 upon said pawl, the handle 98 is disengaged from the quadrant 99 and is raised to the position desired. By raising the handle 98 to a position above the rack quadrant 29, it is possible to permit the pawl 29 to drop into a nearly vertical position, and said pawl is placed in such a position in connection with the assemblage or the dismantling of the machine relatively to the saws.

Adjustments of the extent to which the pawl 29 projects beyond the front of the machine are provided for, preferably, by making the rod 75 in two sections, the adjacent ends of which are socketed in a connecting block 101, as shown in Fig. 2. By moving the sections within the range of adjustment provided for toward or away from one another the pawl 29 will be caused to stand nearer to or farther from the front of the machine, as is obvious.

In addition to the saw filing, saw gumming, and saw feeding instrumentalities above described and all of which participate in the normal operation of the machine, the invention includes means for effecting a relative transverse movement of the machine and the saws, such movement being effected when the sharpening operations are complete as to one saw and the machine is to be positioned to work upon the saw next in order in the series.

In changing the position of the machine following the completion of its work upon one of the saws, the machine is moved rearwardly whereby its instrumentalities are positioned at a suitable distance from the circumference of the saw with which they are alined, then laterally to aline its instrumentalities with the saw next in order in the series and then forwardly to engage its instrumentalities with the saw to be sharpened. To provide for such rearward, lateral and forward movements of the machine, connecting means is interposed between the bed plate 1 and the angle iron support 2 which includes certain elements associated with said angle irons and slidable longitudinally thereof, and other elements associated with the bed plate 1 and slidable in the direction of the longitudinal axis of the machine relatively to the elements which are associated with the angle irons. The elements which are associated with the angle irons comprise superposed plates 102 and 103. The plate 102 extends transversely across the upper face of the angle irons and projects for some distance rearwardly of said angle irons and the plate 103 which is rigidly connected by bolts or otherwise to the plate 102 extends longitudinally of the angle irons and has a central portion which fits closely in the longitudinal space between the angle irons and lateral extensions 104 which engage under the angle irons at each side of the longitudinal space therebetween, the said extensions, in combination with the overlying portions of the plate 102, defining channels into which the co-planar portions of the angle irons project. The plates 102 and 103 are movable as a unit longitudinally of the angle irons in a manner to be hereafter explained and the machine as an entirety is movable with the said plates during the longitudinal movement thereof, the longitudinal movement of the plates 102 and 103 thus effecting a movement of the machine in a direction transverse to its axis. The elements which are associated with the machine and which are movable relatively to the plates 102 and 103 in the direction of the longitudinal axis of the machine comprise superposed plates 105 and 106. The plate 102 is formed between its upper and lower faces with a longitudinal slot 107 which has a mortise or dove-tail cross section, being wider at the under side of said plate than at the upper side thereof; and the plate 105 fits in the slot 107 and is provided at its sides with longitudinal channels in which the over-hanging walls of the slot 107 engage. The plate 106 is imposed upon the plate 105 and is connected by bolts or otherwise to brackets 108 which depend from the bed plate 1 and are formed to fit over a longitudinal keeper 109 rigidly secured at its forward end to the plate 105 and projecting beyond the rear end of the plate 105. An operative connection between the bed plate of the machine and the plate 105 is provided by a screw stem 110 which has threaded engagement in a bracket 111 depending from the bed plate 1 and which at its forward end is swiveled in an angular depending extension 112 provided at the rear end of the keeper 109.

The plate 102 is preferably provided with a guide member 113 which is secured by bolts or otherwise to the under face of the plate 102 adjacent the outer side of the rear angle iron 2 and has a channeled cross section in order that it may fit over the depending portion of said rear angle iron 2.

The operation of shifting the position of the machine to adapt the instrumentalities thereof to a particular saw to be sharpened is initiated by the movement of a lever 114 which is pivoted at its inner end as at 115 to a lug or bracket carried by the plate 102 and is located adjacent the under face of the plate 102. The shifting movement of the machine in the direction of its longitudinal axis is effected through the intermediary of link 116 which connects the lever 114 and the plate 105. The lever 114 projects through a keeper 117 carried by the plate 102 and is normally held against movement by a spring catch 118 secured to the plate 102. The catch 118 holds the lever 114 at the forward limit of its movement and when the position of the machine relatively to the saws is to be changed, the lever 114 is disengaged from the catch 118 (by springing said lever upwardly or by springing said catch downwardly, or by springing both said lever and said catch in the manner stated) and thereupon moved rearwardly as far as is permitted by the keeper 117, which said keeper is preferably provided with an adjustable stop 119 for limiting the rearward movement of the lever 114. When the lever 114 is thus moved rearwardly, the plates 105 and 106 and the bed plate 1 participate as a unit in such rearward movement and the same action occurs in a reverse direction when the lever 114 is moved forwardly into its normal position. The catch 118 obviously prevents any accidental movement of the lever 114 and holds the machine in operative relation to the saw upon which the instrumentalities work.

As stated, the operation of the lever 114 in the manner above described is effective to shift the machine relatively to the saws and such shifting of the machine involves not only longitudinal movements thereof in the direction of its axis, but also a movement thereof transverse to its axis and longitudinally of the angle irons 2. The movement of the machine in the direction of its axis is effected through the intermediary of the link 116, as above explained. The movement of the machine in a direction transverse to its axis is effected by a dog 120 coöperating on the one hand with rack teeth 121 provided on an adjacent side edge of the plate 105, and on the other hand with a clamp 122 mounted on the rear angle iron 2. The clamp 122 comprises a plate 123 which extends across the rear angle iron 2, projecting rearwardly beyond the same and upon the rear projecting portion of which the dog 120 is pivoted, and a pair of engaging lugs 124 which take against opposite edges of the rear angle iron 2. The lugs 124 are so disposed that the clamp may be canted to a somewhat oblique position relatively to the rear angle iron 2, and when so canted, may be moved slidably along said rear angle iron. On the other hand, slidable movement of the clamp is prevented when an outward thrust is exerted against the rear end of the plate 123, the lugs 124 at such time having a friction bite against said plate which is augmented by providing one of said lugs, preferably the one which works in the space between the angle irons 2, with teeth to engage the adjacent edge of the rear angle iron. The clamp is normally canted into a somewhat oblique position by a retractile coil spring 125 connecting the plates 123 and 102 and the dog 120 is kept in engagement with one of the teeth 121 by a suitable spring 126. When the lever 114 is moved rearwardly and the machine, through the intermediary of the link 16, is shifted rearwardly in the direction of its longitudinal axis, that particular tooth 121 with which the dog 120 is engaged will act on said dog to cause the same to exert an outward thrust upon the rear end of the plate 123, in consequence of which the clamp 121 will bind against the rear angle iron 2 and will thus be immovable, while the dog 120 will yield pivotally against the tension of its spring 126 and in such pivotal yielding movement will shift the plate 102 and therewith the machine in a lateral direction through a distance equal to the space between the adjacent saws. When the lever 114 has been moved rearwardly as far as is permitted by the stop 119, the lateral shifting of the machine in the manner explained is completed and thereupon the lever 114 is moved in a reverse direction, or forwardly into its normal position, ultimately being engaged by the catch 118. During the forward movement of the lever 114, the machine is, through the intermediary of the link 116, moved forwardly in the direction of its longitudinal axis to engage its instrumentalities with the saw to be operated on, and as the machine travels forwardly, the dog 120 is held in contact with the tooth 121 by which it was previously operated and, hence, is moved forwardly with the plate 105. Such forward movement of the pawl by its spring 126 permits the spring 125 to draw the clamp 121 toward the machine into the position relative to the machine which said clamp normally occupies; and in this way the clamp is reset so as to be ready to coöperate with the dog 120 in connection with the next shifting operation of the machine.

In connection with the shifting of the machine from saw to saw, as above explained, the plates 105 and 106 move as a unit with the machine in the direction of its longitudinal axis. The plate 106 is, however, movable relatively to the plate 105 and when so moved effects a corresponding movement of the machine. The object of such a movement of the plate 106 relatively to the plate 105 is to adapt the machine to saws of different diameter by regulating the degree to which the files 27, the gummer 28 and the saw feeding pawl 29 project at the front of the machine. Such shifting or adjusting movement of the plate 106 is provided for by the screw stem 110 which at its rear end carries an operating handle 127. The screw stem 110 is held against longitudinal movement by virtue of its swivel connection with the keeper 109 and consequently, being threaded through the bracket 111 produces a longitudinal movement of the bed plate 1 and therewith of the machine in a direction which corresponds to the direction of rotation of said screw stem. The plate 106 participates in such longitudinal movement of the bed plate 1, since it is connected to the brackets 108 carried by said bed plate. The keeper 109 which has a square cross section and fits conformably in recesses defined conjointly by the brackets 108 and the plate 106 serves as a guide for the machine in its longitudinal adjustment consequent to a rotation of the screw stem 110.

As previously stated, the machine may be adapted to saw teeth of varying form and angle; and the manner of adjusting the gummer 28 with the purpose of such an adaptation in view has already been described. Adjustments of the angles of the files 27 for the purpose of adapting said files to variations in the form and angle of the saw teeth are made by changing the angle of the file carrying bars 39, the connections between said bars 39 and the links 45 and between said links and the cross heads 43 being sufficiently loose to permit a certain play in a vertical direction of the bars 39, which play is utilized in making the aforesaid adjustment of said bars. The guides 41 through which the bars 39 slide include a vertical frame 128 which is rigid with the base plates 42 and adjustable guide bars 129 and 130 arranged respectively above and below the bars 39 and secured to the said frames 128 by bolts 131 which pass through vertically elongated slots 132 in the frame 128. The guide bars 129 and 130 are of angular cross section to engage over or overhang the bars 39, as shown in Fig. 5, and they are connected at their rear ends by a plate 133 through which the screws 131 at the rear ends of the bars 129 and 130 pass. For the purpose of adjusting the bars 129 and 130, screws 134 are arranged above the bar 129 and similar screws 135 are arranged below the bar 130, the said screws passing through apertured lugs provided on the frame 128 and being equipped with suitable lock nuts to hold them in any desired position. The bars 129 and 130 may be adjusted pivotally or in rectilinear manner within the range of adjustment provided for by the slots 132, and by adjusting the bars 129 and 130 pivotally the angle at which the file holding bars 39 project may be slightly changed, raised or lowered, as is obvious, while by adjusting the bars 129 and 130 in rectilinear manner the bars 39 may be raised or lowered to change their elevation but without changing their angle. In this way it is possible to adjust the positions of the files in accordance with the particular form of saw teeth which are to be operated on and it is thus assured that, regardless of the form of saw teeth to be sharpened, the machine shall give the most efficient results. Undue friction which might otherwise be occasioned by contact of the file carrying bars 39 with the frames 128 is prevented by the use of spacing plates 138 of narrow extent which are held by the rear pairs of bolts 131.

In order to insure that the saw shall always be kept in the proper plane relatively to the filing instrumentalities, and to thus compensate for any lateral distortion of the saw from its plane, it is preferred to associate with the gummer 28 and with the feed pawl 29, saw guides 136 and 137 which, in each instance, are formed with kerfs into which the marginal portion of the saw projects and which are secured, in the case of the guide 136, to the bearings 50, and in the case of the guide 137 to the shank of the pawl 29.

The operation of the machine will be readily apparent from the foregoing description. The gearing between the main shaft 30 and the shaft 34 is such that a relatively slow rotation of the shaft 30 will produce a relatively rapid rotation of the shaft 34 and, hence, a relatively rapid reciprocation of the files. The gearing is preferably so selected that the files will make three complete strokes or reciprocations for each revolution of the shaft 30 and the filing of the sides of the teeth is completed during the three strokes or reciprocations of the files 127. The gummer is formed and arranged to deepen the teeth when they have become worn or too shallow and to make a square throat at the bottom of the teeth in order to prevent them from cutting the lint. During each revolution of the shaft 30 the gummer shaft 48 and therewith the gummer will be elevated to disengage the gummer from the saw teeth and during the elevation of the shaft 48 the feed pawl 29 will be operated to rotate the saws through a distance equivalent to the length of a tooth. In connection with the operation of the pawl 29 the files 27 will be moved in the manner already described away from the sides of the saw in order that they may present no obstacle to the rotation of the saws by the feed pawl 29. After the saw has been rotated by the feed pawl 29 through a distance equivalent to the length of a tooth, the said pawl 29 is reset, the files 27 are moved toward one another to engage at the side of the tooth now presented thereto and the gummer shaft 48, and therewith the gummer, is lowered to engage the gummer into the tooth immediately following the one previously operated upon by the gummer. The above operations are performed in automatic sequence until all the teeth in the saw have been operated upon by the files and the gummer, after which the machine is shifted to a position wherein it is alined with the saw next in order in the series, the shifting of the machine and the engagement of its instrumentalities with the next succeeding saw being effected by an operation of the lever 114 in the manner previously explained.

Having fully described my invention, I claim:—

1. In a gin saw filing machine, a base, a transverse main shaft supported adjacent the rear end of the base, reciprocatory file carrying bars arranged longitudinally of the base, a rotatable gummer shaft extending longitudinally of the base, a second transverse shaft, multiplying gearing for driving the second transverse shaft from the first one, the second transverse shaft having crank arms, operative connections between said crank arms and said reciprocatory file carrying bars and bevel gearing between said second transverse shaft and said gummer shaft.

2. In a gin saw filing machine, a base, a transverse main shaft supported adjacent the rear end of the base, reciprocatory file carrying bars arranged longitudinally of the base, a rotatable gummer shaft extending longitudinally of the base, a second transverse shaft, multiplying gearing for driving the second transverse shaft from the first one, the second transverse shaft having crank arms, pivoted base plates supporting said file carrying bars, an oscillatory bearing for said gummer shaft, operative connections between said crank arms and said reciprocatory file carrying bars, bevel gearing between said second transverse shaft and said gummer shaft, means operated from said main shaft for raising said gummer shaft during a period of each revolution of said main shaft and other means operated from said main shaft for moving said pivoted base plates about their pivots during a period of each revolution of said main shaft.

3. In a gin saw filing machine, a base, a transverse main shaft supported adjacent the rear end of the base, reciprocatory file carrying bars arranged longitudinally of the base, a second transverse shaft, gearing between said shafts, operative connections between said second transverse shaft and said reciprocatory file carrying bars, pivoted base plates supporting said file carrying bars, a saw feed pawl, means operated from said main shaft for operating said saw feed pawl during a period of each revolution of said main shaft, and means operated by an element of said last-named means for moving said base plates about their pivots during a period of each revolution of said main shaft.

4. In a gin saw filing machine, a base, a transverse main shaft supported adjacent the rear end of the base, reciprocatory file carrying bars arranged longitudinally of the base, a second transverse shaft, gearing between said shafts, operative connections between said second shaft and said reciprocatory file carrying bars, pivoted base plates supporting said file carrying bars, a saw feed pawl, means operated from said main shaft for operating said saw feed pawl during a period of each revolution of said main shaft and including a reciprocatory rod, and operative connections between said reciprocatory rod and said pivoted base plates to move the latter about their pivots in consequence of an operative movement of said rod.

5. In a gin saw filing machine, a base, a transverse shaft supported adjacent the rear end of the base, gearing for driving said shaft, a longitudinally extending gummer shaft, an oscillatory bearing for said gummer shaft, a frame arranged at the front end of the base and pivotally mounted for movement in the longitudinal plane of the machine, a cross head slidably mounted in said frame, a bearing carried by said cross head for the front end of the gummer shaft, means for periodically raising said cross head, and gearing between said transverse shaft and said gummer shaft.

6. In a gin saw filing machine, a base, a transverse shaft supported adjacent the rear end of the base, driving means therefor, a longitudinally extending gummer shaft, an oscillatory bearing for said gummer shaft, a frame arranged at the front end of the base and pivotally mounted for movement in the longitudinal plane of the machine, a cross head slidably mounted in said frame, a bearing carried by said cross head for the front end of the gummer shaft, means for periodically raising said cross head, gearing between said transverse shaft and said gummer shaft, a sleeve surrounding said gummer shaft and extending from said oscillatory bearing, and a nut connecting said sleeve and said bearing carried by said cross head and operable to adjust said bearing head whereby to regulate the projection of the gummer shaft, the gearing between said shafts permitting of longitudinal adjustment of the gummer shaft.

7. In a gin saw filing machine, a base, a transverse main shaft supported adjacent the rear end of the base, a rotatable gummer shaft extending longitudinally of the base, a second transverse shaft, gearing between said transverse shafts, gearing between said second transverse shaft and said gummer shaft, an oscillatory bearing for said gummer shaft, a vertically reciprocatory cross head arranged near the front end of the base, a bearing carried by said cross head for the front end of the gummer shaft, an eccentric on said main shaft, and operative connections between said eccentric and said cross head to raise the latter during a period of each revolution of said main shaft.

8. In a gin saw filing machine, a base, a transverse main shaft supported adjacent the rear end of the base, a saw filing instrumentality, operating means therefor, means for periodically disengaging said saw filing instrumentality from the saw upon which it works, a saw feed pawl, a spring held lever carrying the said pawl, a reciprocatory rod connected to said lever, a pivotally mounted arm operatively connected to said rod, and cam means operating upon said arm during each revolution of said main shaft.

9. In a gin saw filing machine, a base, a transverse main shaft supported adjacent the rear end of the base, reciprocatory file carrying bars, operative connections between said main shaft and said file carrying bars, pivoted base plates supporting said file carrying bars, a saw feed pawl, a reciprocatory rod for operating said pawl, means actuated by the main shaft for operating said rod during a period of each revolution of said main shaft, a block mounted on said rod and movable therewith, and links connecting said block and said pivoted base plates.

10. In a gin saw filing machine, a base, upright frame members arranged near the rear end thereof, a transverse shaft supported between said frame members, operating means for said shaft, crank arms projecting from the ends of said shaft, reciprocatory file carrying bars extending longitudinally of said base, supporting guide means for said bars, reciprocatory cross heads, longitudinal guide means for said cross heads arranged on each of said frame members, pitmen connecting said cross heads and said crank arms, and links connecting said cross heads and said file carrying bars.

11. In a gin saw filing machine, a base, upright frame members arranged near the rear end thereof, a transverse shaft supported between said frame members, operating means for said shaft, cross heads reciprocatory in the longitudinal plane of the machine and operated by said shaft, reciprocatory file carrying bars, supporting guide means for said bars, pivotally mounted base plates carrying said supporting guide means, links connecting said file carrying bars and said cross heads, and means for periodically moving said base plates about their pivots.

12. In a gin saw filing machine, a base, a transverse main shaft supported adjacent the rear end of the base, reciprocatory file carrying bars arranged longitudinally of the base, a rotatable gummer shaft extending longitudinally of the base, an oscillatory bearing for the gummer shaft, a vertically reciprocatory cross head arranged near the front end of the base, a bearing carried by said cross head for the front end of the gummer shaft, a second transverse shaft, gearing between said transverse shafts, gearing between said second transverse shaft and said gummer shaft, pivoted base plates supporting said file carrying bars, a saw feed pawl, operative connections between said second transverse shaft and said reciprocatory file carrying bars, an eccentric on said main shaft, operative connections between said eccentric and said reciprocatory cross head, a reciprocatory rod extending longitudinally of the base and operating said feed pawl, a block movable with said rod, links connecting said block and said pivoted base plate, and cam means actuated by the main shaft for operating said rod during a period of each revolution of the main shaft.

13. In a gin saw filing machine, a base, a transverse shaft supported adjacent the rear end of the base, operating means for said shaft, a longitudinally extending gummer shaft, longitudinally reciprocatory file carrying bars, an oscillatory bearing for said gummer shaft, a vertically reciprocatory support for the front end of said gummer shaft, means for periodically moving said support, bevel gearing connecting said transverse shaft and said gummer shaft, crank arms projecting from said transverse shaft, longitudinally reciprocatory cross heads, links connecting said cross heads and said file carrying bars, pitmen connecting said cross heads and said crank arms, pivoted base plates supporting said file carrying bars and means for periodically moving said base plates about their pivots.

14. In a gin saw filing machine, a base, saw filing instrumentalities carried thereby, a support for said base, a plate slidable lengthwise of said support, the latter extending transversely of said base, said base receiving support from said plate and being movable in the direction of its axis relatively to said plate, and means for effecting in a single operation a movement of said plate lengthwise of said support and a reciprocatory movement of said base in the direction of its axis relative to said plate.

15. In a gin saw filing machine, a base, saw filing instrumentalities carried thereby, a support for said base, a plate slidable lengthwise of said support, the latter extending transversely of said base, said base receiving support from said plate and being movable in the direction of its axis relatively to said plate, a lever pivoted at one end thereof to said plate and extending transversely thereof, a spring catch normally holding said lever, a second plate imposed upon said first-named plate and connected to said base, a link connecting said lever and said second plate, a movement of said lever producing a movement of said second plate and therewith of said base in the direction of the longitudinal axis of said base, a dog arranged at one side of said second plate and having toothed engagement therewith, and a holder for said dog and on which the latter is pivoted, a spring acting upon said dog, and a spring connecting said holder and said base and tending to draw the holder toward the base, the holder being held by the spring connected thereto whereby it is slidable lengthwise of said support in one direction but remains immovable against the thrust exerted by said dog and tending to effect its movement in an opposite direction.

In testimony whereof I have hereunto set my hand in presence of two subscribing witnesses.

WYLEY L. PADGETT.

Witnesses:
 JAMES R. BROWN,
 HUGH R. BLACK.

Copies of this patent may be obtained for five cents each, by addressing the "Commissioner of Patents, Washington, D. C."